United States Patent [19]
Littrell

[11] Patent Number: 4,892,570
[45] Date of Patent: Jan. 9, 1990

[54] WATER PRECIPITATOR APPARATUS

[76] Inventor: Melvin M. Littrell, P.O. Box 1213, Canutillo, Tex. 79835

[21] Appl. No.: 245,811

[22] Filed: Sep. 19, 1988

[51] Int. Cl.$^4$ .............................................. B01D 53/26
[52] U.S. Cl. .......................................... 55/269; 55/80; 62/93
[58] Field of Search ................. 55/80, 268, 269; 62/93

[56] References Cited

U.S. PATENT DOCUMENTS

| | | | |
|---|---|---|---|
| 4,146,372 | 3/1979 | Groth et al. ........................ | 55/80 X |
| 4,182,152 | 1/1980 | Nasser et al. ......................... | 62/93 |
| 4,242,110 | 12/1980 | Hynes ..................................... | 55/269 |
| 4,242,111 | 12/1980 | Arends et al. ......................... | 55/269 |
| 4,285,702 | 8/1981 | Michel et al. ........................ | 55/80 X |

Primary Examiner—Charles Hart
Attorney, Agent, or Firm—Victor Flores; Harry M. Weiss

[57] ABSTRACT

An improved water precipitator which provides a water supply over an extended surface area of land in a high temperature region by condensing water on piping chilled by a refrigerant circulating within the piping.

1 Claim, 2 Drawing Sheets

WATER PRECIPITATOR APPARATUS

BACKGROUND OF THE INVENTION

1. Field of the Invention

The present invention generally relates to an improved water precipitator which inexpensively provides precipitated water over an extended surface area of land in a high temperature region.

2. Description of the Prior Art

In the past, high temperature regions throughout the world have suffered from many problems due to water shortages in that region. Efforts have been made to solve this problem, however most solutions have proved to be too costly for efficient use in the production of drinking water or water for agricultural use. Water production systems tend to require large expenditures of energy and produce relatively small quantities of water. Also, many of the solutions provide a reservoir of water, which then requires that the water be transported to the area for desired use. In agricultural uses, the requirement of transport of the water makes water production under these systems cost prohibitive.

Nasser et al (U.S. Pat. No. 4,182,132) discloses a system which may be used to produce water. Nasser primarily discloses an apparatus for cooling ambient air temperatures in humid, high-temperature regions. A by-product of the cooling apparatus is condensed water. The Nasser apparatus is a tower which utilizes a blower to draw in ambient air to the center of the tower. The cooler air then sinks or is drawn downward through an evaporator in the system. Part of the air is also forced upwardly through the condenser of the system. Water then condenses on the cold surface of the evaporator and is collected at the bottom of the tower. However, Nasser uses a refrigeration cycle requiring a condenser, an evaporator and a compressor. Nasser also requires a motor-powered blower to draw air into the device. Therefore, the Nasser apparatus would require too large of expenditures of energy for use in the production of large quantities of water for extended surface areas of land.

Because of the primary purpose of Nasser, to cool the ambient air, the air must be collected at an intermediate location well above ground level and above the cooler layer along the ground. The water collects at the base of the tower and must be transported to where it is needed. Therefore, it would be every inefficient to use the Nasser apparatus to provide water throughout an extended surface area.

Therefore, a need still existed for a water precipitator which inexpensively produces water throughout an extended surface area of land in a high temperature region without a need for a separate transport system.

SUMMARY OF THE INVENTION

It is an object of this invention to provide an improved water precipitator apparatus which inexpensively produces water.

It is a further object of this invention to provide an improved water precipitator apparatus which precipitates water throughout an extended surface area of land.

It is a still further object of this invention to provide an improved water precipitator apparatus which may be used in regions of high temperature and various levels of humidity.

The aforementioned and other objects are accomplished, according to the present invention, by an improved water precipitator which collects hot air over an extended surface land area, forces the air against a system of piping with refrigerant running throughout, then collects the resulting precipitated water.

The foregoing and other objects, features and advantages of this invention will be apparent from the following, more particular, description of the preferred embodiments of this invention, as illustrated in the accompanying drawings.

DESCRIPTION OF THE PREFERRED EMBODIMENT

Figure 1:
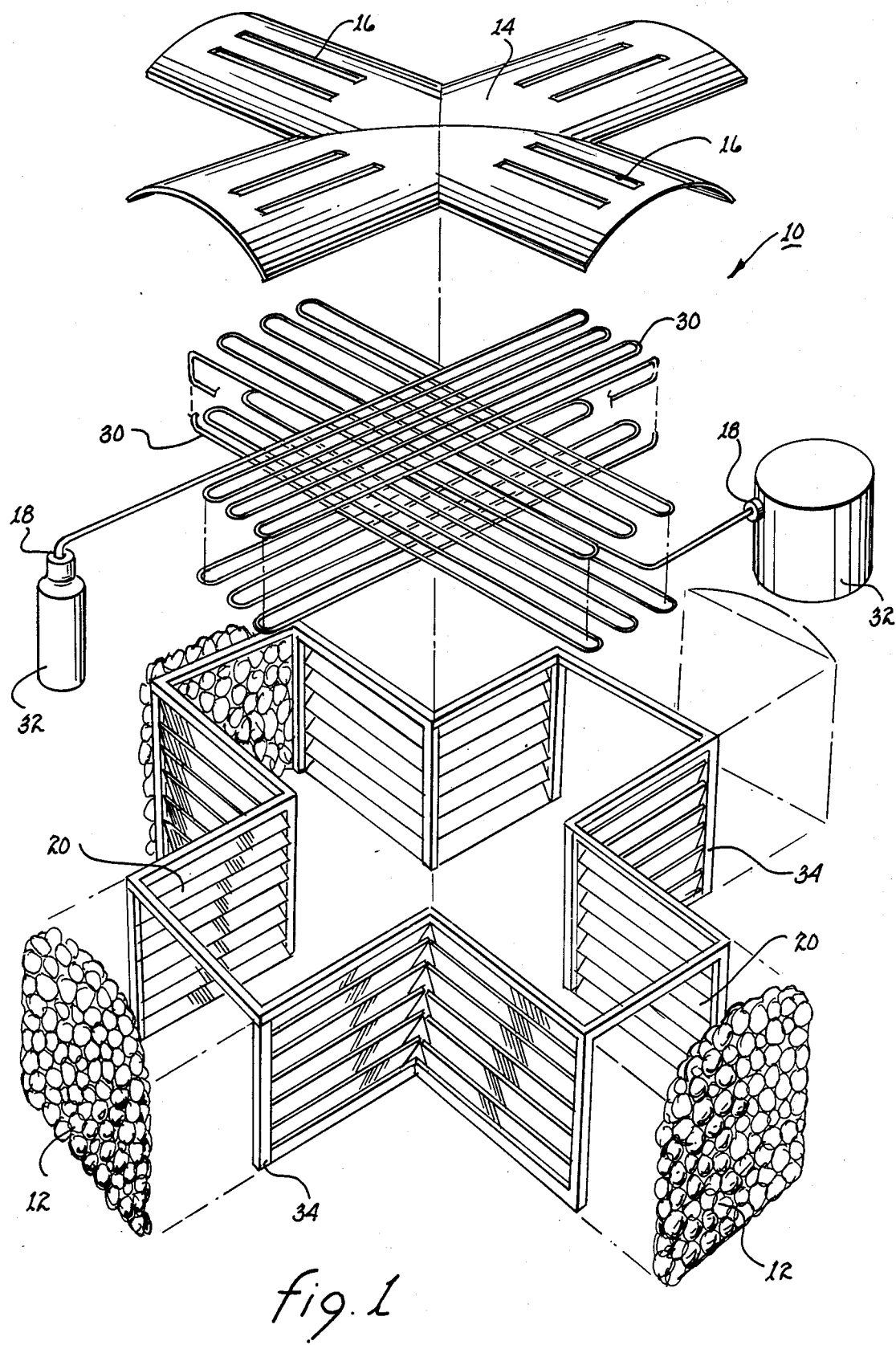
FIG. 1 is a perspective view of the improved water precipitator apparatus with elements shown separately.

Referring now to FIG. 1 of the accompanying drawings which set forth the present invention in greater detail and in which like numerals designate like features, an improved water precipitator apparatus 10 is generally comprised of a roof member 14, a plurality of piping 30, a plurality of storage tanks 32, a structural member 34, a plurality of air intake means 20, and a plurality of wall members 12. In the preferred embodiment, the structural member 34 is a cross-shaped member, approximately eight feet high with four arms 26 extending approximately twelve feet in length. This size and shape of structural member 34 has proven to most efficiently precipitate water over an extended surface area of land with a minimal requirement of wind flow in any direction. The shape or size of the structural member, however, can be altered to conform to specific needs and terrain conditions.

The wall members 12 are constructed out of stone and seal the ends of the arms 26 of the structural member 34 to prevent air from entering the structural member 34 through the ends of the arms 26. Therefore, the preferred embodiment comprises four wall members 12, one for each arm 26. The air intake means 20 are comprised of a series of air intake flaps 21. layered down the height of the arms 26 of the structural member 34. Each air intake flap 21 is hinged on both sides to the structural member 34. The air intake flaps 21 overlap at an angle sufficient to allow a five mile per hour wind to activate the air intake means 20. Therefore, a minimum five mile per hour wind will either force the air intake flaps 21 into an open or closed position depending on the direction of the wind.

The plurality of piping 30 is located on top of the structural member 34. The piping 30 provides a pathway through which the refrigerant flows. The piping 30 is preferably copper to provide the best conductivity. In the preferred embodiment, the piping 30 is coiled and stacked to cover the entire cross-sectional area of the structural member 34. The more piping 30 used, the more precipitation will occur. Therefore, the amount of pipe 30 can be altered to provide the desired amount of precipitated water. Each end of the piping 30 is connected to a storage tank 32 through a control valve 18. One storage tank 32 is of a sufficiently larger volume than the storage tank 32 connected to the opposite end of the piping 30. Therefore, when the control valves 18 are opened, the refrigerant will naturally flow from the storage tank 32 with a larger volume to the storage tank 32 of a smaller volume. The refrigerant circulated in the piping 30 is preferably butane, however other types of refrigerant may be used, including compressed freon.

The roof member 14 covers the piping 30, and contacts the upper surface of the structural member 34. The roof member 14 contains an air outlet means 16 for allowing the hot air to rise out of the structural member 34. In the preferred embodiment, the air outlet means 16 is a plurality of elongated slots in the roof member 14.

Figure 2:
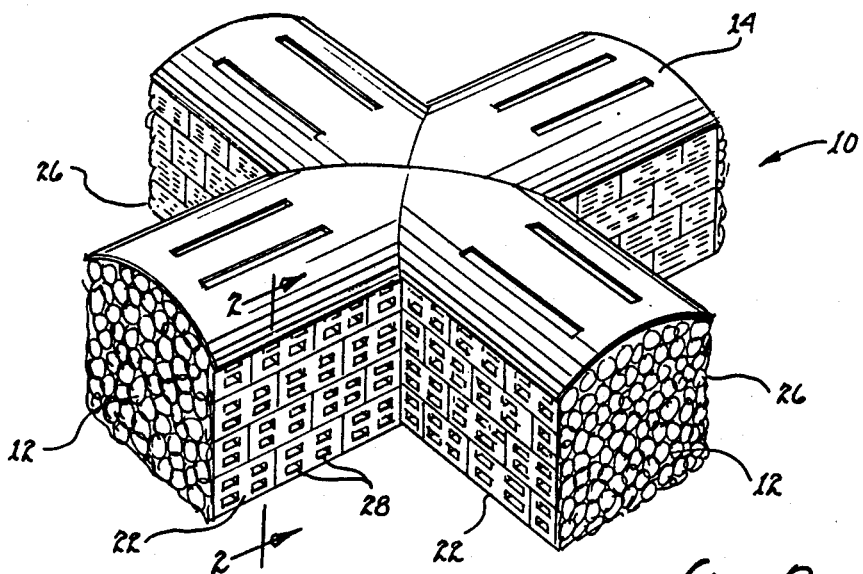
FIG. 2 is a perspective view of the invention.

As best shown in FIG. 2, the structural member 34 may be supported by a plurality of cinder blocks 22. The cinder blocks 22 are located along the arms 26 of the structural member 34 on the outer side of the air intake means 20. The cinder blocks 22 provide more support for the structural member 34 and protect the air intake means 20 from damage.

Figure 3:
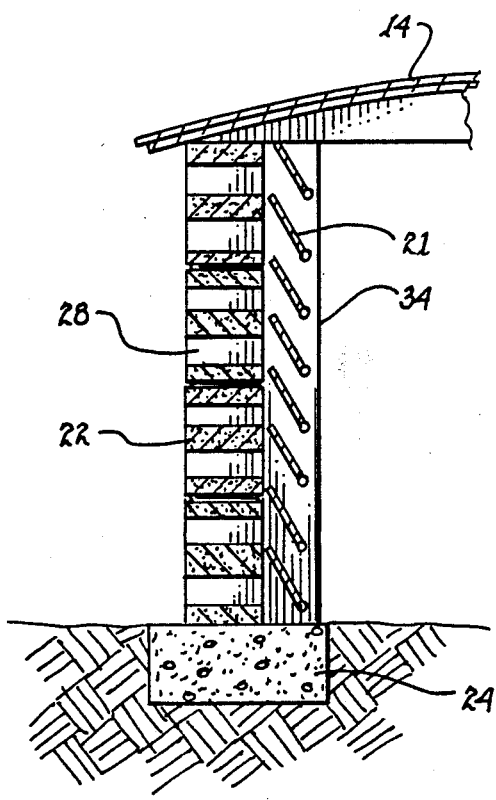
FIG. 3 is a side cross sectional taken along line 2—2 of FIG. 2.

As best shown in FIG. 3, the cinder blocks 22 contain a plurality of apertures 28 to allow air flow through the cinder blocks 22 to activate the air intake flaps 21. The cinder blocks 22 and the structural member 34 are situated upon a water collection means 24 for collecting the precipitated water. The water collection means 24 is preferably constructed of a fiberglass material. The water collection means 24 may also be built at an angle so that the precipitated water runs to a specified collection point.

SYSTEM OPERATION

The water precipitator 10 is prepared for use by connecting the larger storage tank 32 at one end of the piping 30 and the smaller storage tank 32 at the other end of the piping 30. The control valves 18 are then opened so that the refrigerant in the storage tanks 32 freely flows slowly through the piping 30.

For example, a minimum wind of five miles per hour blowing through the cylinder blocks 22 (See FIGS. 2 and 3) on one side will pass through the air intake flaps 21 adjacent to the side of the cinder blocks 22, but will shut the air intake means 20 on the opposite side of the structure by closing the louvres 20 on the opposite side thereby trapping the hot air inside the structural member 34. The wall members 21 also function to trap the hot air inside the structural member 34. The hot air naturally rises and comes into contact with the piping 30 filled with flowing refrigerant. As a result of the hot air touching the cold piping 30, which lowers the temperature of the air below the dew point, water precipitates on the piping and drips downward into the water collection means 24 at the bottom of the structural member 34. The hot air then escapes by rising from the structural member 34 through the air outlet means 16 in the roof member 14 of the water precipitator apparatus 10.

While the invention has been particularly shown and described in reference to the preferred embodiments thereof, it will be understood by those skilled in the art that changes in form and details may be made without departing from the spirit and scope of the invention.

I claim:
1. An improved water precipitator apparatus comprising, in combination:
    refrigeration means comprised of coils of metal piping connected at one end to a tank filled with Butane and connected at the other end to an empty tank for condensing hot air into water;
    structural member means for capturing the hot air irrespective of wind direction and which relies on convection to move the hot air past said refrigeration means; and
    air intake means comprised of a series of air intake flaps that are activated, to the open or closed position, solely by the dynamic pressure of the incoming air for permitting said hot air to enter into said structural member means.

* * * * *